United States Patent [19]

Aramaki et al.

[11] Patent Number: 4,730,094

[45] Date of Patent: Mar. 8, 1988

[54] ELECTRIC SPARK MACHINING APPARATUS

[75] Inventors: Jun Aramaki; Toshiaki Tanaka, both of Nagoya, Japan

[73] Assignee: Mitsubishi Denki Kabushiki Kaisha, Tokyo, Japan

[21] Appl. No.: 942,757

[22] Filed: Dec. 17, 1986

[30] Foreign Application Priority Data

Dec. 18, 1985 [JP] Japan .................. 60-285016

[51] Int. Cl.⁴ .............................................. B23H 7/36
[52] U.S. Cl. .................. 219/69 D; 204/129.2; 204/224 M
[58] Field of Search ............ 219/69 D; 62/215, 228.1; 204/129.2, 224 M

[56] References Cited

U.S. PATENT DOCUMENTS

| | | | |
|---|---|---|---|
| 3,522,711 | 8/1970 | Shaughnessy | 62/215 |
| 4,257,238 | 3/1981 | Kountz et al. | 62/228.1 |
| 4,282,718 | 8/1981 | Kountz et al. | 62/228.1 |
| 4,491,714 | 1/1985 | Inoue | 219/69 M |
| 4,584,845 | 4/1986 | Hansen et al. | 62/228.1 |

FOREIGN PATENT DOCUMENTS

| | | | |
|---|---|---|---|
| 3535546 | 4/1986 | Fed. Rep. of Germany | 219/69 D |
| 1326482 | 4/1963 | France | 219/69 D |
| 2518442 | 6/1983 | France | 219/69 D |

Primary Examiner—A. D. Pellinen
Assistant Examiner—Geoffrey S. Evans
Attorney, Agent, or Firm—Sughrue, Mion, Zinn, Macpeak and Seas

[57] ABSTRACT

An electric spark machining apparatus includes a cooling device which is arranged so that machining liquid pumped up from a reservoir and fed to an electric spark machine is controlled in temperature to minimize a temperature difference between machining liquid entering into the electric spark machine and the latter.

5 Claims, 3 Drawing Figures

ELECTRIC SPARK MACHINING APPARATUS

BACKGROUND OF THE INVENTION

The present invention relates to an electric spark machining apparatus and, particularly, to such apparatus equipped with a cooling means for cooling machining liquid to control a temperature thereof to an optimum value for a specific machining.

FIG. 1 shows, schematically, a typical example of a conventional electric spark machining apparatus having a ccoling means. In FIG. 1, the electric spark machine 1 is associated with a machining liquid supply device 2 for supplying the machining liquid to the machine 1. Used liquid in the machine 1 is returned through a drain pipe 101 to the liquid supply device 2, pumped by a pump 3 to a filter 4 and filtered thereby. A cleaned liquid 21 is returned through a supply pipe 6 to a machining portion of the electric spark machine 1 by a pump 5. In such circulation of the machining liquid, it is heated by electric discharge energy and/or driving energy of the pumps 3 and 5, which may affect a machining accuracy of products adversely. Therefore, the machining liquid must be regulated in temperature, suitably.

A cooling means is used to realize the regulation of machining liquid temperature. The cooling means includes a cooling device 7 and a pump 22 for supplying the liquid 21 to the cooling device 7. The cooling device 7 includes a heat-exchanger tank 71 and a compressor 72 for compressing a coolant of the cooling device.

The cooling device 7 further includes a first temperature sensor 8 for sensing a temperature of the machine 1 or an ambient temperature, a second temperature sensor 9 for sensing the temperature of the liquid in the liquid supply device 2, a comparator 10 for comparing an output of the first sensor 8 with that of the second sensor 9 to provide a temperature difference signal and a control device 11 responsive to the difference signal from the comparator 10 to on-off control the compressor 72 to thereby regulate the liquid temperature to a preset value.

With such cooling means, it is possible to control the temperature of liquid 21 in the liquid supply device 2. However, liquid 21 is heated by the pump 5 and, particularly, the temperature of a portion of the liquid 21 which passes through a supply portion of liquid directly connected to the machine 1 tends to vary with variation of shaft power of the pump 5 or variation of flow-rate of the liquid, causing a stabilization of the temperature of the liquid to be fed to the machining portion of the machine 1 to be impossible.

Further, since an amount of liquid 21 in the liquid supply device 2 is considerable, there is a considerable time lag in a response of the temperature control to a variation of the output signal of the sensor 8, which makes the liquid temperature control insufficient.

SUMMARY OF THE INVENTION

The present invention was made in view of the above mentioned defects of the conventional electric spark machining apparatus and, therefore, an object of the present invention is to provide an electric spark machining apparatus which is capable of equalizing the temperature of the liquid portion to be fed to a machining portion of the apparatus to a temperature of the apparatus or an ambient temperature with a minimized time lag so that the machining accuracy is not influenced by the temperature of the liquid substantially.

According to the present invention, a cooling device is arranged in a liquid circuit between a pump for supplying a machining liquid to the electric spark machining apparatus and the apparatus. A temperature of liquid passing through the cooling device directly to the apparatus is detected upon which a cooling capacity of the cooling device is continuously controlled such that the temperature of liquid passing therethrough is regulated to a preset value.

DETAILED DESCRIPTION OF THE PREFERRED EMBODIMENTS

Figure 1:
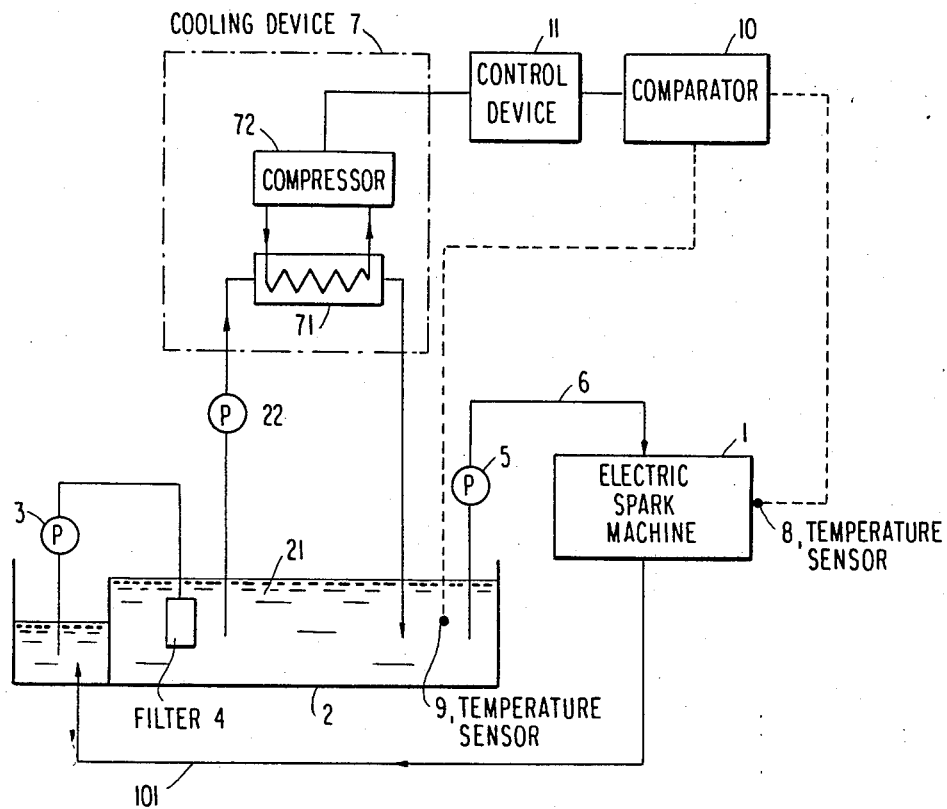
FIG. 1 shows, schematically, a conventional electric spark machining apparatus.
Figure 2:
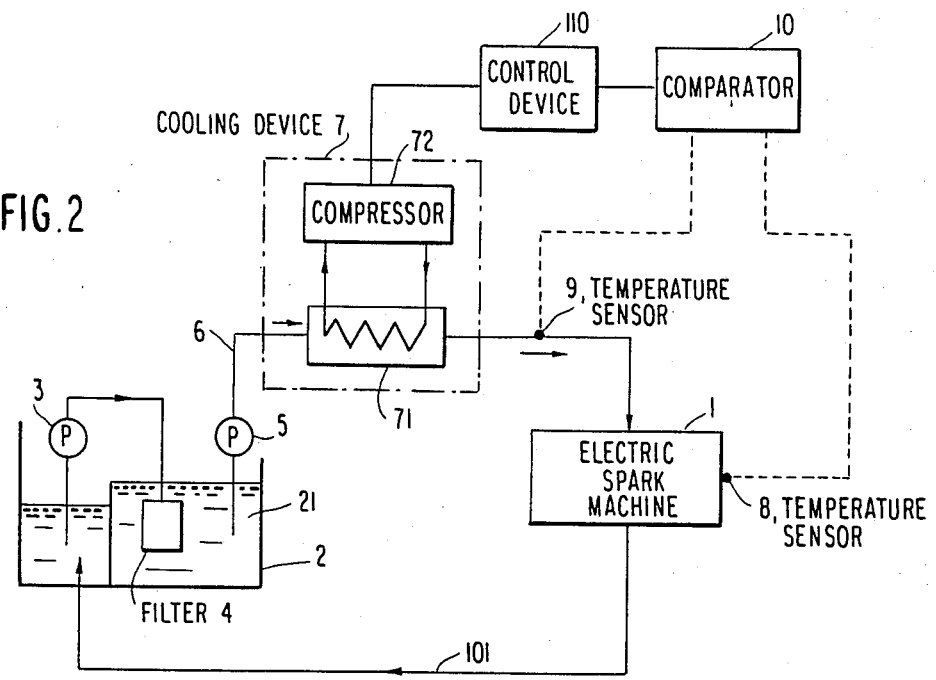
FIG. 2 shows an embodiment of the present invention, schematically.

In FIG. 2 which shows an embodiment of the present invention and in which the same components as those shown in FIG. 1 are depicted by the same reference numerals, respectively, a machining liquid 21 which is cleaned by a filter 4 is pumped by a supply pump 5 to pass through a liquid supply circuit 6 to a heat-exchange tank 71 of a cooling device 7. After heat-exchange in the heat exchange tank 71, it is supplied to an electric spark machining apparatus 1.

A temperature of liquid passing through the liquid supply circuit 6, particularly, discharged from the cooling device 7 is detected by a liquid temperature sensor 9 disposed in the liquid supply circuit 6 on the side of the apparatus 1. A temperature of the apparatus or an ambient temperature is detected by a sensor 8. Outputs of the sensors 8 and 9 are supplied to a comparator 10 and an output of the latter is fed to a control device 110 for controlling compressor 72. The control device 110 includes an inverter (not shown) for controlling a revolution speed of an electric motor (not shown) of the compressor 72 in proportion to a magnitude of the output signal of the comparator 10.

In operation, the machining liquid which is heated by friction heat generated by shaft power of the pump 5 is cooled by a heat exchange performed in the heat exchange tank 71. A degree of cooling is detected by the liquid temperature sensor 9 and fedback, together with the temperature of the apparatus or the ambient temperature detected by the sensor 8, through the comparator 10 to the cooling device 7.

Since the number of revolution of the compressor 72 is substantially in proportion to the cooling capacity of the cooling device 7, the latter can be controlled by controlling the number of revolution of the motor of the compressor 72 by means of the control device 110. That is, the rotation speed of the motor is controlled such that the temperature of liquid to be supplied to the apparatus 1, which is detected by the sensor 9, becomes equal to that of the apparatus 1, which is detected by the sensor 8.

Thus, the liquid temperature on the discharge side of the heat exchanger tank 71 can be regulated to a constant value by controlling the rotation speed of the motor of the cooling device with respect to the temperature variation of liquid due to a variation of power of the pump 5 caused by a variation of pressure on a load side of the pump or due to a variation of liquid flow rate when the heating of the pump is constant.

In the embodiment, the cooling capacity is controlled by the inverter of the control device 110. In such case, there may be a limitation in a control range. That is, when a lower limit of amount of heat generation of the pump is lower than a lower limit of capacity of the cooling device, it is possible to arrange a heater in the liquid circuit for compensating for a heat generation of the pump to thereby control the liquid temperature to the constant value.

Figure 3:
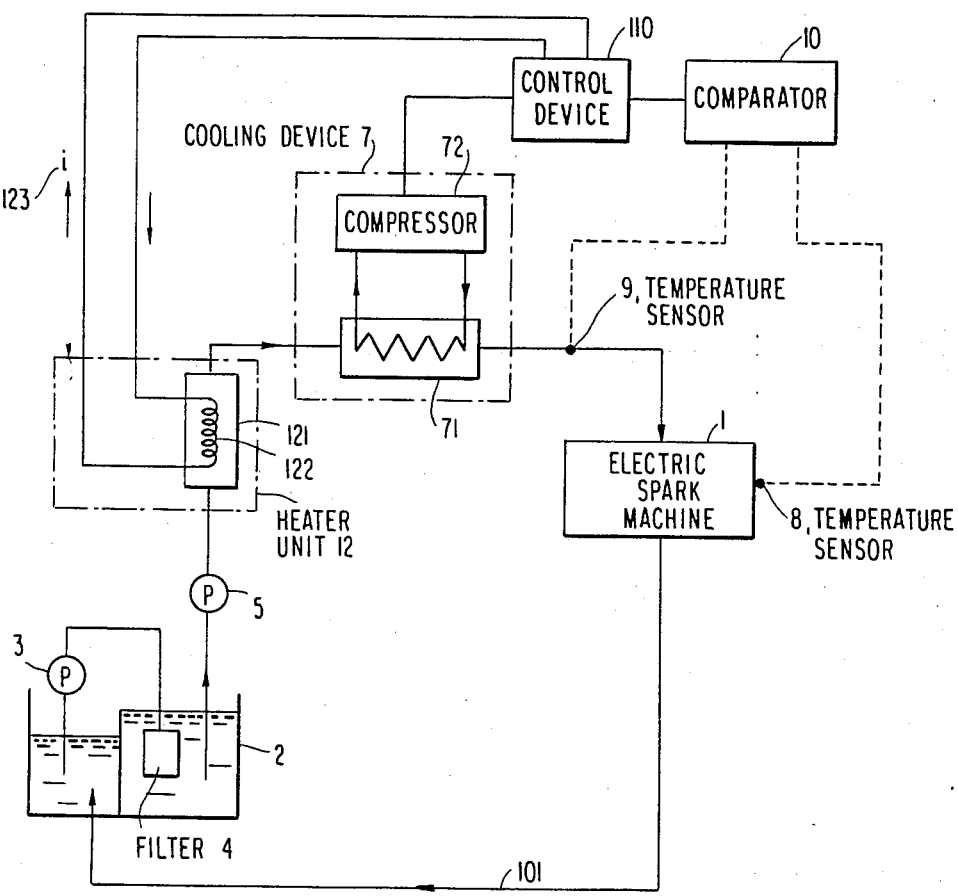
FIG. 3 shows another embodiment of the present invention.

In another embodiment of the present invention shown in FIG. 3, a heater unit 12 is provided in the liquid circuit 6. The heater unit 12 comprises a heat exchange tank 121 and a heater 122 arranged in the heat exchange tank 121. The heater 122 is connected to the control device 110 and supplied with a current 123 therefrom to heat the liquid flowing therethrough. In this case, thermal energy of liquid heated by the pump 5 and the heater 122 should be larger than the lower limit of cooling capacity of the cooling device 7 and smaller than an upper limit thereof. The liquid temperature is controlled to the constant value by controlling an amount of current 123 supplied by the control device 110 such that the heating by the heater and the cooling by the cooling device 7 are well balanced.

There may be a case where the temperature of liquid in the spark machining apparatus 1 is risen locally due to a machining energy. In order to restrict such temperature increase in the machining portion, i.e., in the machining tank, to thereby make the liquid temperature in the machining portion equal to that of the machining apparatus or to ambient temperature, the temperature sensor 9 may be arranged within the machining tank. In the latter case, the influence of the liquid temperature on the machining accuracy may be further improved.

Generally, when a high speed machining is performed by the electric spark machining apparatus, the pressure of liquid is high and the shaft power of the pump is large, necessarily, resulting in an increased amount of heat generated by the pump, and, when the finishing machining is performed, the liquid pressure and the heat generation are small. According to the present invention in which the cooling device is arranged on the discharge side of the pump and the temperature of the liquid flowing toward the machine is detected to control the cooling capacity continuously by feeding it back to the cooling device, the machining liquid can be supplied to the machine at a constant temperature even in such case and, therefore, a degradation of machining accuracy due to the variation of the liquid temperature can be avoided, allowing the electric spark machining with high precision.

What is claimed is:

1. An electric spark machining apparatus, comprising: an electric spark machine (1), a pump (5) for supplying machining liquid (21) to a machining portion of said electric spark machine, a cooling device (7) disposed in series and downstream of said pump in a liquid supply path (6) extending from said pump to said electric spark machine, means (9) for sensing the temperature of pumped machining liquid flowing out from said cooling device, and means (110) responsive to an output signal from said sensing means for controlling the cooling capacity of said cooling device and attendantly the temperature of said machining liquid.

2. The electric spark machining apparatus as claimed in claim 1, wherein said controlling means controls the cooling capacity of said cooling device by controlling the rotation speed of a compressor provided in said cooling device.

3. The electric spark machining apparatus as claimed in claim 1 or 2, further comprising a heater (12) disposed in series in said liquid supply path between said supply pump and said cooling device, the capacity of said heater being controlled by said controlling means to further control the temperature of said machining liquid.

4. The electric spark machining apparatus as claimed in claims 1 or 2, further comprising means (8) for sensing the temperature of the electric spark machine, and a comparator (10) responsive to output signals from both of said sensors for outputting a difference signal to said controlling means such that the temperature of said machining liquid is equalized to that of said electric spark machine.

5. The electric spark machining apparatus as claimed in claim 3, further comprising means (8) for sensing the temperature of the electric spark machine, and a comparator (10) responsive to output signals from both of said sensors for outputting a difference signal to said controlling means such that the temperature of said machining liquid is equalized to that of said electric spark machine.

* * * * *